US005604304A

United States Patent [19]

Kokubo et al.

[11] Patent Number: 5,604,304

[45] Date of Patent: Feb. 18, 1997

[54] ENGINE CYCLE TIMING AND SYNCHRONIZATION BASED ON CRANKSHAFT ANGLE MEASUREMENTS

[75] Inventors: Naoki Kokubo, Nukata-gun; Koji Sakakibara, Hekinan; Koichi Kamabora, Tokoname; Kenichi Nagase, Kariya, all of Japan

[73] Assignee: Nippondenso Co., Ltd., Kariya, Japan

[21] Appl. No.: 622,393

[22] Filed: Mar. 27, 1996

[30] Foreign Application Priority Data

Mar. 28, 1995 [JP] Japan .................................... 7-069017

[51] Int. Cl.[6] .......................... F02D 41/06; G01M 15/00

[52] U.S. Cl. .................................... 73/117.3; 364/431.03; 73/116

[58] Field of Search .................................... 73/116, 117.2, 73/117.3, 118.1; 364/431.03

[56] References Cited

U.S. PATENT DOCUMENTS

| | | | |
|---|---|---|---|
| 5,079,945 | 1/1992 | Hansen et al. | 73/116 |
| 5,165,271 | 11/1992 | Stepper et al. | 73/116 |
| 5,353,635 | 10/1994 | Saiki et al. | 73/117.2 |
| 5,548,995 | 8/1996 | Clinton et al. | 73/117.3 |

FOREIGN PATENT DOCUMENTS

| | | |
|---|---|---|
| 60-240875 | 11/1985 | Japan . |
| 1-195975 | 8/1989 | Japan . |
| 3-275981 | 12/1991 | Japan . |
| 5-87245 | 11/1993 | Japan . |
| 6-213052 | 8/1994 | Japan . |

*Primary Examiner*—Richard Chilcot
*Assistant Examiner*—George M. Dombroske
*Attorney, Agent, or Firm*—Nixon & Vanderhye P.C.

[57] ABSTRACT

A memory stores and holds both the number of crankshaft angle pulse signals occurring after detecting a reference portion when an engine stops and data relating to whether the reference portion which is supposed to be next detected upon re-start of the engine is a reference position of the camshaft. When the engine is re-started, it is determined whether a reverse rotation of the crankshaft across the reference position happened by comparing a predetermined value with the total obtained by adding the number of pulse signals stored in the memory and the number of pulse signals occurring until the reference portion is first detected again. When such reverse rotation happened, the reference position of the camshaft is shifted by 360° CA. Therefore, regardless of whether such reverse rotation across the reference position happened or not, the engine timing cycle is again precisely synchronized.

21 Claims, 11 Drawing Sheets

ENGINE CYCLE TIMING AND SYNCHRONIZATION BASED ON CRANKSHAFT ANGLE MEASUREMENTS

CROSS REFERENCE TO RELATED APPLICATION

This application is based upon and claims priority from Japanese Patent Application No. Hei 7-69017 filed Mar. 28, 1995, the contents of which are hereby incorporated herein by reference.

BACKGROUND OF THE INVENTION

1. Field of the Invention

The present invention relates to method and apparatus for determining engine cycle timing using only a crankshaft angle (CA) sensor.

2. Related Art

A conventional four cycle engine is provided with a crankshaft angle sensor which generates a pulse signal every predetermined crank angle interval and a camshaft angle sensor which generates a pulse signal during each rotation of the camshaft (equivalent to two rotations of the crank shaft). A reference position of the camshaft is detected responsive to the output signal from the camshaft angle sensor. A crank angle is determined by counting the number of crank angle sensor pulse signals while a standard predetermined position of the camshaft is used as a reference. As a result, the state of all engine cylinders can be determined as a function of the crank angle.

In such conventional devices, however, since a camshaft angle sensor is needed in addition to the crankshaft angle sensor, there are disadvantages. For example, the structure of the device becomes complicated and manufacturing costs go up.

In an attempt to avoid these disadvantages, Japanese Patent Application Laid-Open No. Sho 60-240875 teaches that the stopped position of a crankshaft can be stored in a memory when the engine stops. After that, engine cycle timing is detected by using the stored stopped position when the engine is re-started. Ignition timing control and fuel injection timing control are performed based on the resultant engine cycle timing detection.

However, because a large compression force acts on an engine piston when it approaches top dead center (hereinafter, referred to as TDC), rotational torque after the engine is turned off may not be high enough to force the piston beyond TDC. As a result, the engine may actually reverse its direction slightly just before coming to a complete stop. Consequently, if the engine has so reversed, there is a difference between the actual stopped angle of the crankshaft and the stored stopped angle of the crankshaft. As a result, the determination of stopped engine state may be faulty due to the difference.

As another method to determine engine cycle timing without a signal from a camshaft angle sensor when an engine is re-startsd, Japanese Patent Application Laid-Open No. Hei 6-213052 discloses a device which cuts fuel injection to a specific cylinder and makes a determination depending on whether a misfire of that specific cylinder occurs or not. However, when causing the misfire intentionally by cutting fuel injection to a specific cylinder, engine torque fluctuation occurs and the device therefore has a disadvantage in that drivability of the engine deteriorates.

SUMMARY OF THE INVENTION

The present invention provides a precise determination of engine cycle timing without a camshaft angle sensor while also minimizing deterioration of engine drivability.

An exemplary system according to the present invention includes a pulse signal generator for generating pulse signals at constant intervals responsive to an engine crankshaft rotation and for generating a reference signal at a predetermined crank angle. A reference position of the crankshaft is detected based on the reference signal. A specific crank angle is determined as a function of the number of pulse signals occurring after the standard position of the crankshaft is detected. Engine state is then determined as a function of the detected crank angle. The reference position of the crankshaft is detected, for example, every 360° CA (equivalent to one complete rotation of the crankshaft). In this case, the reference position of the crankshaft also becomes a reference position of the camshaft every 720° CA (equivalent to two rotations of the crankshaft). The reference position of the camshaft corresponds to a specific state of a specific cylinder of the engine.

In the present exemplary embodiment of this invention, a storing device stores and holds both the number of pulse signals occurring after detection of the reference position of the crankshaft when the engine stops, which is equivalent to a stopped position of the crankshaft, and data relating to whether the reference position of the crankshaft which is expected to be detected upon the next engine re-start is also the reference position of the camshaft. When the engine is re-started, a starting device sets the engine in motion by using data relating to the reference position of the camshaft stored in the storing device. A reverse-rotation determination also is made to determine whether during engine stoppage the crankshaft has reversely rotated from a position beyond the reference position to a position before the reference position of the crankshaft. This reverse-rotation determination may be based on the number of pulse signals already stored in the storing device (after engine stoppage) and the number of pulse signals occurring after engine re-start until the reference position of the crankshaft is again detected.

In other words, as shown with arrow A in FIG. 4, if the crankshaft has reversely rotated from a position beyond the reference position of the crankshaft (e.g., 30° CA) to a position before the reference position when the engine stopped, the reference position of the crankshaft which next will be detected when the engine re-starts is the same one which had been detected just prior to engine stoppage. Therefore, when it is next used to determine the regular reference position of the crankshaft, the apparent reference position of the camshaft will be caused to deviate by 360° CA. Accordingly, in the present exemplary embodiment, the number of pulse signals stored in the storing device upon engine stoppage is added to the number of pulse signals occurring after re-start until the next reference position of the crankshaft is detected. The resulting total number of pulse signals is compared with a predetermined value. When the total number of apparent pulse signals is lower than the predetermined value, it is determined in the exemplary embodiment that reverse rotation of the crankshaft across the reference CA boundary has occurred. The apparent reference position of the camshaft is therefore shifted by 360° CA to offset the thus detected deviation of 360° CA. On the other hand, when it is determined that reverse rotation of the crankshaft across the reference CA boundary did not happen, the apparent reference position of the camshaft is not shifted and is thereafter used without change for ignition timing control etc. Consequently, regardless of whether reverse rotation of the crankshaft across the reference CA happened or not, a precise determination of engine cylinder state is made upon re-start.

In the present invention, a forcible stop device, which causes the crankshaft to forcibly not to reversely rotate when the engine stops, also can be adopted. The forcible stop of the crankshaft can be realized by continued driving of at least one auxiliary engine-driven machine (e.g., such as an air conditioner, an alternator and a torque converter which are loads against the engine) when the engine is being stopped. Further, the forcible stop also can be realized by cutting ignition or fuel injection operations at predetermined times when the engine is being stopped. The true reference position of the camshaft at engine stoppage can then be stored and held in the storing device. When the engine is re-started, a starting device can use the true reference position of the camshaft as previously stored in the storing device. In this case, since the forcible stop device has prevented reverse rotation of the crankshaft, a precise engine cylinder state determination can be made using the true reference position of the camshaft as stored in the storing device.

Furthermore, precise engine state can be determined at re-start by using a provisional reference position of the camshaft. When engine re-start is based on a provisional reference camshaft position, an increase in engine rotational speed is monitored. It is determined whether or not the provisional reference position of the camshaft is correct, depending on increases in engine rotational speed. If the provisional reference camshaft position is not correct, it is shifted by 360° CA. In other words, when the engine is restarted based on a provisional reference camshaft position, if engine rotational speed goes up smoothly, it can be determined that the provisional reference camshaft position is correct. Accordingly, the provisional reference position of the camshaft is set to remain the actual reference position of the camshaft, as it is. However, if engine rotational speed does not go up smoothly, it can be determined that the provisional reference camshaft position is wrong. In this case, only after the provisional reference camshaft position is shifted by 360° CA, it is set to become the regular or actual reference position of the camshaft.

In addition, according to the present invention, an idle stabilizing device may control ignition timing for cylinders so that idle rotational engine speed is stabilized based on the provisional reference position of the camshaft. It can be determined whether or not the provisional reference position of the camshaft is correct depending on the degree of fluctuations in engine rotational speed when such idle stabilizing control is performed. In other words, when idle stabilizing control is performed by using the provisional reference position of the camshaft, if the engine rotational speed fluctuation is restricted within certain limits, it can be considered that the provisional reference position of the camshaft is correct. In this case, the provisional reference camshaft position is set to become the regular or actual reference camshaft position. On the other hand, if engine rotational speed fluctuations are not so restricted in spite of performing idle stabilizing control, it can be determined that the provisional reference camshaft position is wrong. In this case, after the provisional reference position of the camshaft is shifted by 360° CA, it is set to become the regular or actual reference position of the camshaft.

It should be noted that idle stabilizing control can be performed by controlling fuel injection amounts instead of controlling ignition timings. In this case, it can be determined whether the provisional reference position of the camshaft is correct depending on the degree of fluctuation in engine rotational speeds when above-described idle stabilizing control is performed.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF EXEMPLARY EMBODIMENTS

Figure 1:
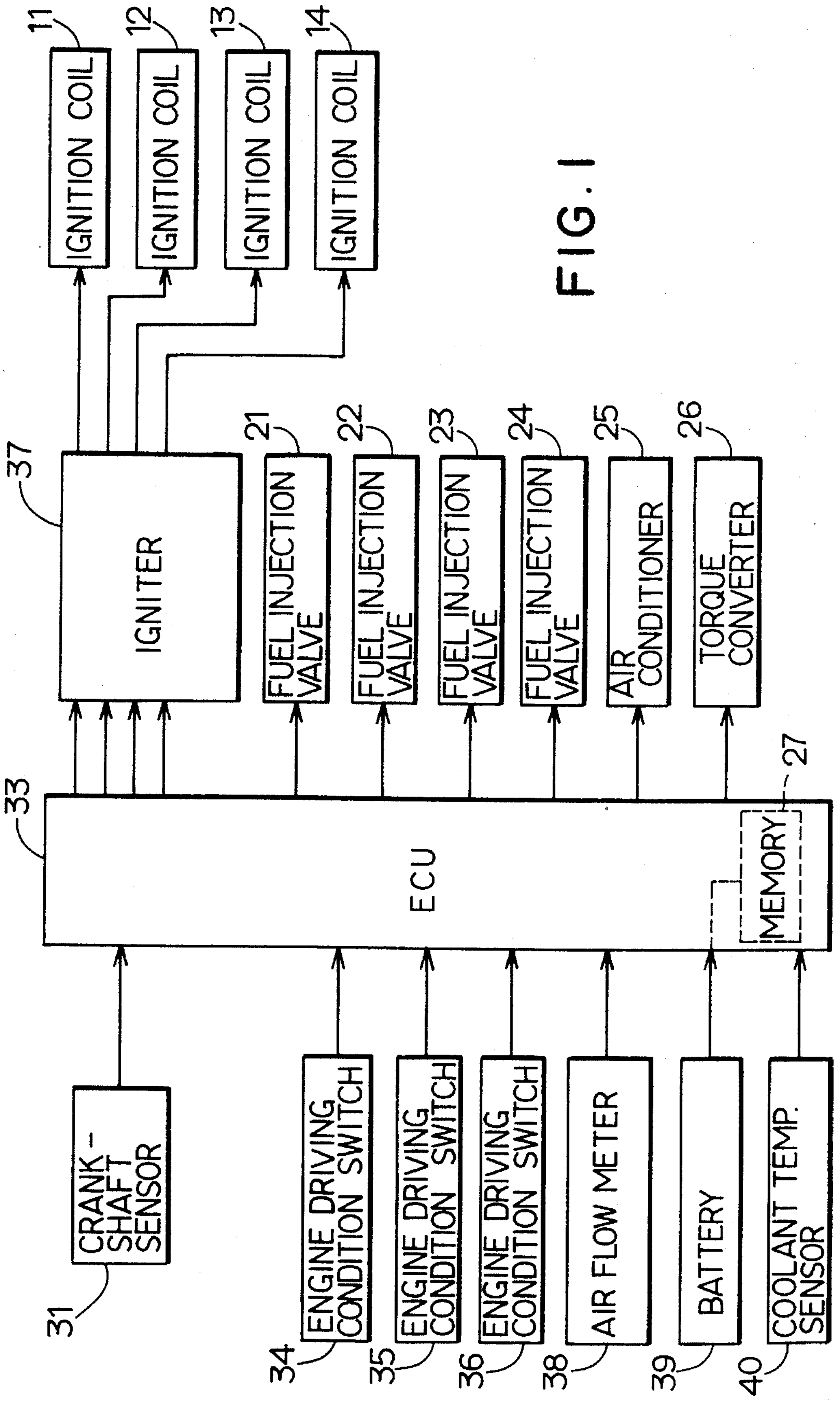
FIG. 1 is a block diagram illustrating a system according to a first embodiment of the present invention.
Figure 2:
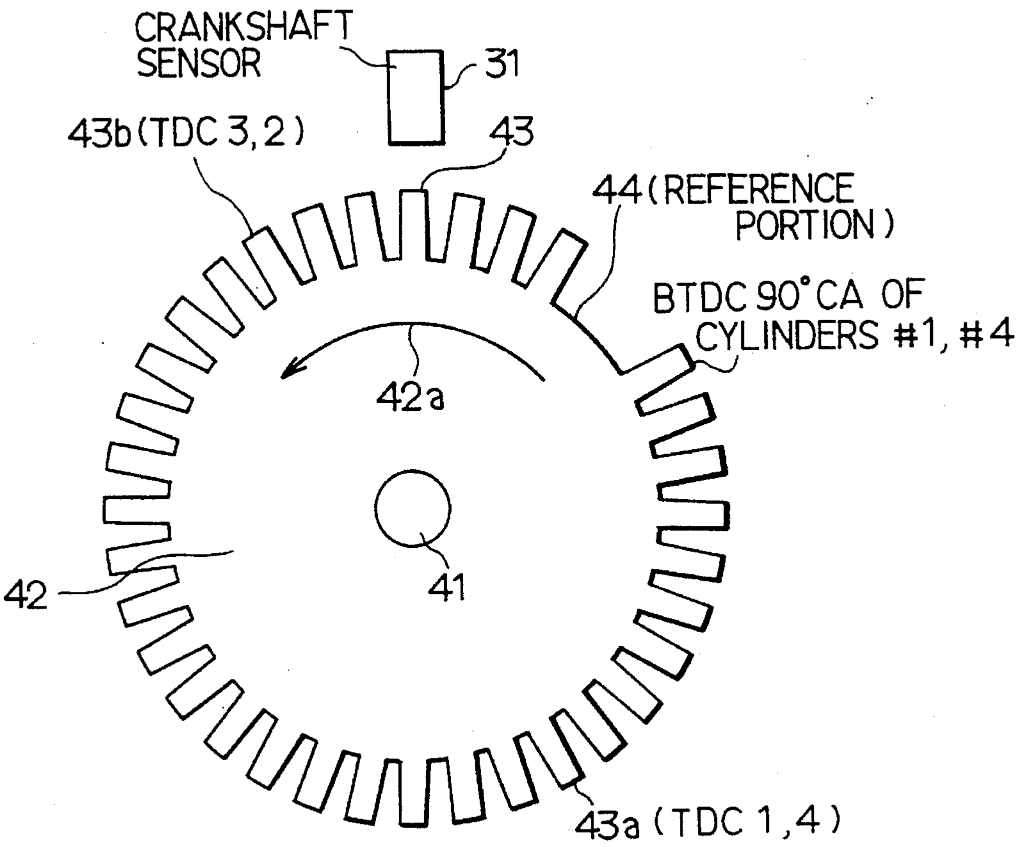
FIG. 2 is a schematic view illustrating an exemplary relationship between a crankshaft angle sensor and a signal generating rotor.

A first embodiment of the present invention will be described in detail with reference to FIGS. 1 through 9A and 9B. First of all, a whole system for engine control will be described in brief with reference to FIG. 1. In the first embodiment, a four cycle engine with four cylinders #1 to #4 (not shown) is to be controlled. The engine is provided with four ignition coils 11 to 14 and four fuel injection valves 21 to 24 respectively corresponding to the four cylinders #1 to #4. In this exemplary engine with four cylinders #1 to #4, pistons of cylinders #1 and #4 and pistons of cylinders #2 and #3 simultaneously reciprocate at the same phase. While one of two pistons reciprocating at the same phase performs an intake stroke, the other cylinder of the pair performs a combustion stroke.

A crankshaft angle signal, which is a pulse signal generated from a crankshaft sensor 31, is provided as input to an electronic control unit (ECU) 33. ECU 33 determines engine cycle timing and computes a reference position and rotational speed of a crankshaft and so on. In addition, ECU 33 computes optimum ignition timings and of fuel injection amounts for each cylinder based on the crankshaft signal and engine driving condition data provided from switches 34 to 36 such as a starter switch, an idle switch or the like, an air flow meter 38 detecting a quantity of intake air, a battery 39 and a coolant temperature sensor 40 detecting engine coolant temperature. ECU 33 switches on or off ignition coils 11 to 14 of cylinders #1 to #4 by generating ignition signals to an igniter 37, and controls fuel injection valves 21 to 24 by generating fuel injection signals.

Furthermore, ECU 33 can turn on/off an air conditioner 25 mounted on a vehicle and a torque converter 26 for an automatic transmission. When ECU 33 turns on torque converter 26, the automatic transmission can, for example, shift its gear position to a neutral position. Therefore, a load due to torque converter 26 can be imposed on the engine. A memory 27, which is connected to battery 39 directly, is installed in ECU 33.

Crankshaft sensor 31 may be an electromagnetic pickup sensor which is placed so as to face the periphery of a signal rotor 42 attached to a crankshaft 41. On the periphery of signal rotor 42, teeth 43 are formed at intervals of, for example, 10° CA. In the first embodiment, reference portion 44 corresponds to two missing teeth on a part of the periphery of signal rotor 42. The position of reference portion 44 is ten or eleven teeth (that is, 100° CA or 110° CA) away in the forward rotated direction of crankshaft 41 (the direction of arrow **42*a* in FIG. 2) from a tooth 43*a* facing crankshaft sensor 31 when crankshaft 41 reaches a crank angle corresponding to top dead center of cylinder #1 (hereinafter, referred to as TDC1, and expressed in an analogous way for the other cylinders) or TDC4. A tooth 43*b* facing crankshaft sensor 31 when crankshaft 41 reaches a crank angle corresponding to TDC2 or TDC3 is 180° CA (equivalent to a half rotation of crankshaft 41) away from tooth 43*a***.

Figure 3:
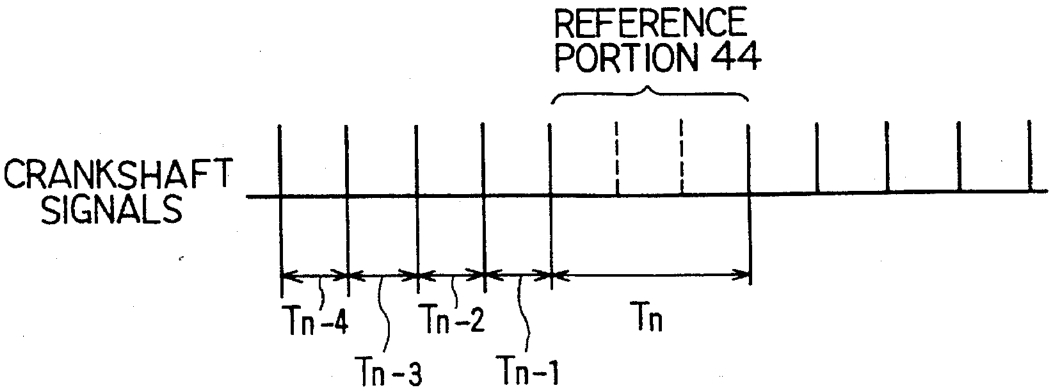
FIG. 3 is a timing chart illustrating signal wave forms of crankshaft angle signals.

Crankshaft sensor 31 generates pulse signals (crankshaft signals) at a constant interval except for a predetermined crank angle (corresponding to reference portion 44) responsive to rotations of crankshaft 41, as shown in FIG. 3. The time (and/or angular) interval between pulse signals at the predetermined reference crank angle is therefore three times as long as usual. The position of reference portion 44 is a standard or reference position of crankshaft 41, and is detected every 360° CA (equivalent to one rotation of crankshaft 41).

In the exemplary engine with four cylinders #1 to #4, the ignition order of cylinders #1 to #4 is assumed to be #1→#3→#4→#2, and the cylinder to be ignited thus shifts every 180° CA (a half rotation of crank axis 41) in this order. Reference portion 44 is detected as a reference position of the camshaft every 720° CA (two rotations of crankshaft 41), to determine which of TDC1 or TDC4 (or, TDC2 or TDC3) tooth **43*a* (or 43*b*) corresponds to, when crankshaft sensor 31 detects tooth 43*a* (or 43*b*) of signal rotor 42**.

Figure 4:
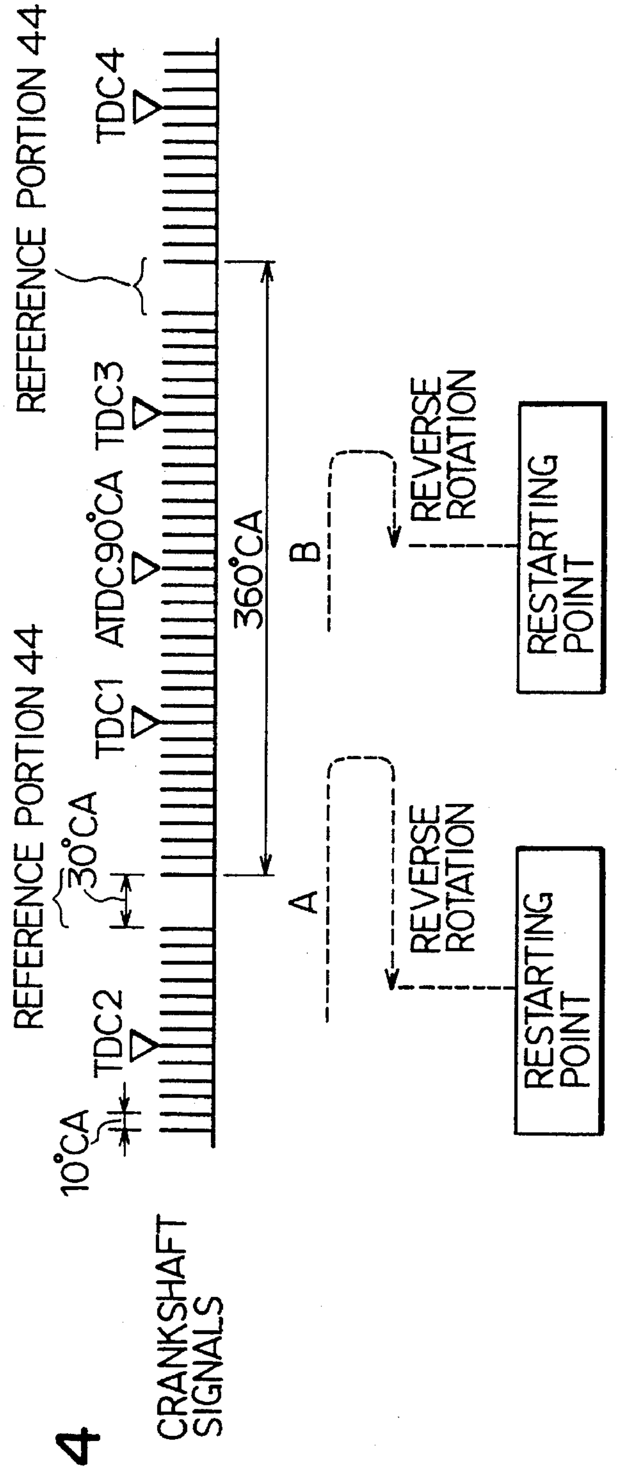
FIG. 4 is a timing chart illustrating reverse rotation of a crankshaft when an engine stops.

Because a large compression force acts on a piston of the engine when the piston approaches TDC, rotational torque after the engine has been turned off may not be enough to force piston to go beyond TDC, as shown with dotted arrows A and B in FIG. 4. As a result, the engine rotation may reverse in the process of coming to a complete stop. As shown with arrow A in FIG. 4, if crankshaft 41 has reversely rotated from a position beyond reference portion 44 (the reference position of crankshaft 41) to a position before reference portion 44 when the engine stopped, then reference portion 44 which is first detected when the engine re-starts is the same one which had already been detected and stored in memory 27 in ECU 33 during engine stoppage. Therefore, if it is counted as the reference portion 44, the reference position of the camshaft deviates by 360° CA and it causes the wrong cylinder to be selected for combustion and processes. On the other hand, as shown with arrow B in FIG. 4, if the reverse rotation of crankshaft 41 did not cross reference portion 44, then when it is next first detected upon engine re-start, the apparent reference standard position of the camshaft upon re-start does not need to be shifted.

Therefore, in the first embodiment, memory 27 (backed up with battery 39) stores and holds the number of crankshaft signals since the last detection of reference portion 44 (which is equivalent to a stoppage of assumed crankshaft position) and data (a value of cylinder identifying flag XCAM) relating to whether the next detection of reference portion 44 is the correct or standard position of the camshaft. When the engine is re-started, the number of crankshaft signals last stored in memory 27 upon engine stoppage is added to the number of new crankshaft signals occurring after re-start until reference portion 44 is next first detected. The total number of crankshaft signals thus accumulated are compared with a predetermined value. When the total number of crankshaft signals is lower than the predetermined value, it can be determined that reverse rotation of crankshaft 41 across the reference position has happened. In this case, the apparent standard reference position of the camshaft is shifted by 360° CA. On the other hand, when it is determined that reverse rotation of crank axis 41 across the reference position has not happened, the pre-existing reference position of the camshaft already stored in memory 27 is not shifted and it continues to be used for ignition timing control etc., as it is.

Next, processes performed by ECU 33 will be described in more detail with reference to the flow charts in FIGS. 5 to 8.

Figure 5:
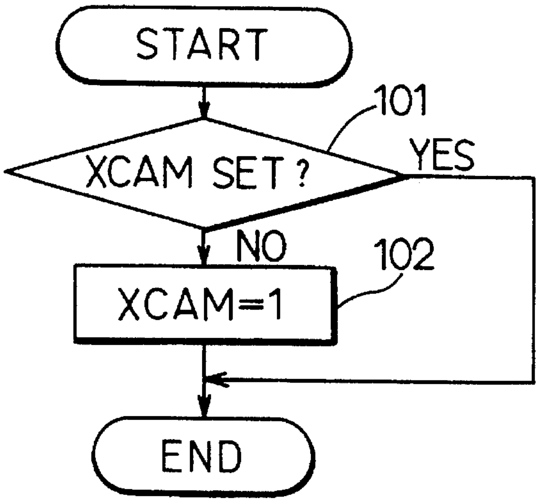
FIG. 5 is a flow chart illustrating the setting of flag XCAM when the electronic control unit (ECU) of FIG. 1 is initialized.

The flow chart in FIG. 5 shows a routine for forcibly setting cylinder determination flag XCAM to "1" when ECU 33 is initialized (that is, when ECU 33 is supplied with electric power for the first time after the vehicle is manufactured or after data stored in memory 27 is lost due to detachment of battery 39 or the like). Cylinder determination flag XCAM is a flag for determining whether cylinder #1, which is a specific cylinder, performs a compression stroke or cylinder #4, which is deviated by 360° CA against cylinder #1, performs a compression stroke when reference portion 44 is detected. The standard position of the camshaft is then determined based on the value of cylinder determination flag XCAM.

In this routine, at step 101, it is determined whether cylinder determination flag XCAM has not been set yet, that is, whether an initialization of ECU 33 is being executed. If cylinder determination flag XCAM has not been set yet, the process of ECU 33 proceeds to step 102. At step 102, cylinder determination flag XCAM is forcibly set to "1". If cylinder determination flag XCAM has been set already, this routine is terminated without changing the value of XCAM.

Figure 6:
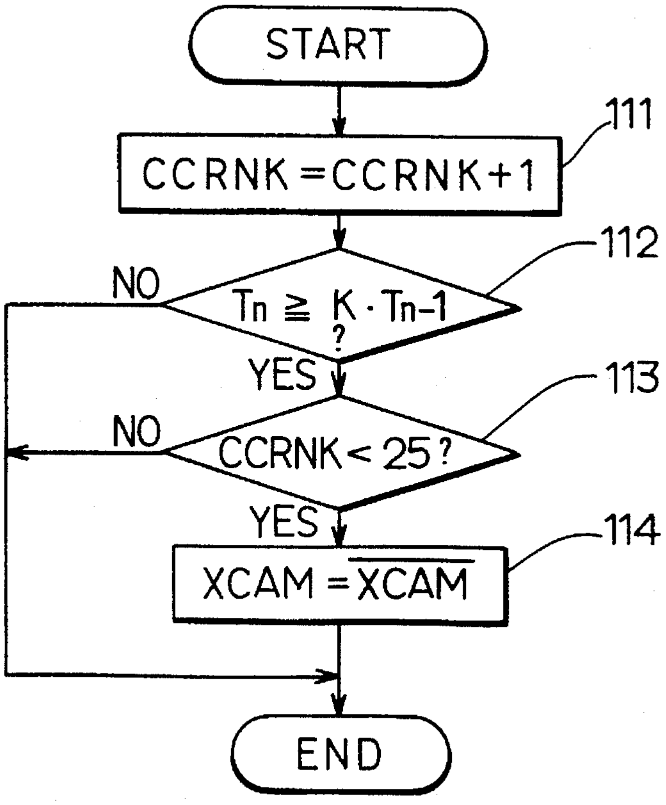
FIG. 6 is a flow chart illustrating the setting of a flag XCAM at times other than initialization of the ECU.

The flow chart in FIG. 6 shows an interrupt routine for updating cylinder determination flag XCAM. This routine is performed by interrupting the process otherwise being executed by ECU 33 every time the crankshaft signal from crankshaft sensor 31 is provided to ECU 33 (i.e., every 10° CA in this embodiment except during reference portion 44). At step 111, a crankshaft signal counter CCRNK is increased by "1". Crankshaft signal counter CCRNK counts up the number of crankshaft signals provided to ECU 33. Its initial value is the value of crankshaft signal counter CCRNK when the previously engine stopped. That is, the number of crankshaft signals last occurring after reference portion 44 is detected is accumulated and maintained in CCRNK.

At step 112, it is determined if reference portion 44 has just been passed depending on whether the following equation (1) is satisfied.

$$Tn \geqq K \times Tn-1 \qquad (1)$$

wherein Tn is the time interval between the currently detected crankshaft signal and the last-detected crankshaft signal, Tn−1 is the time interval between the last-detected crankshaft signal and the crankshaft signal detected just before that and K is a determination reference value (K>1). When equation (1) is not satisfied, that is, reference portion 44 is not yet detected, subsequent processes in FIG. 6 are not performed and the routine comes to an end.

On the other hand, when reference portion 44 has just passed, the relation of equation (1) is satisfied. In this case, the process of ECU 33 proceeds to step 113. At step 113, the value of crankshaft signal counter CCRNK is compared with a predetermined value (e.g. "25") to determine whether or not a reverse rotation shown with arrow A in FIG. 4 has happened. The value of crankshaft signal counter CCRNK at this time equals a value in which the number of crankshaft signals stored in memory 27 when the engine stopped and the number of crankshaft signals occurring until reference portion 44 is first next detected are totalled. Because the number of crankshaft signals in one complete 360° of CA are "33" while reference portion 44 is detected twice in succession, if the value of crankshaft signal counter CCRNK is lower than 25, it is considered that the reverse rotation across the reference position as shown with arrow A in FIG. 4 happened. In this case, at step 114, the value of cylinder determination flag XCAM is inverted (that is, the value "1" is turned into "0", the value "0" is turned into "1"). As a result, the reference position of the camshaft (e.g., corresponding to specific cylinder #1) is shifted by 360° CA. The processes of step 111 to step 113 thus provide an exemplary reverse rotation determination detector.

At step 113, when the value of crankshaft signal counter CCRNK is 25 or more, it is determined that reverse rotation of the type shown with arrow A in FIG. 4 did not happen. The value of cylinder determination flag XCAM stored in memory 27 is thus used without being inverted. According to the flow chart in FIG. 5, cylinder determination flag XCAM is therefore maintained at a correct value all the time regardless of whether or not reverse rotation as shown with arrow A in FIG. 4 happened.

Figure 7:
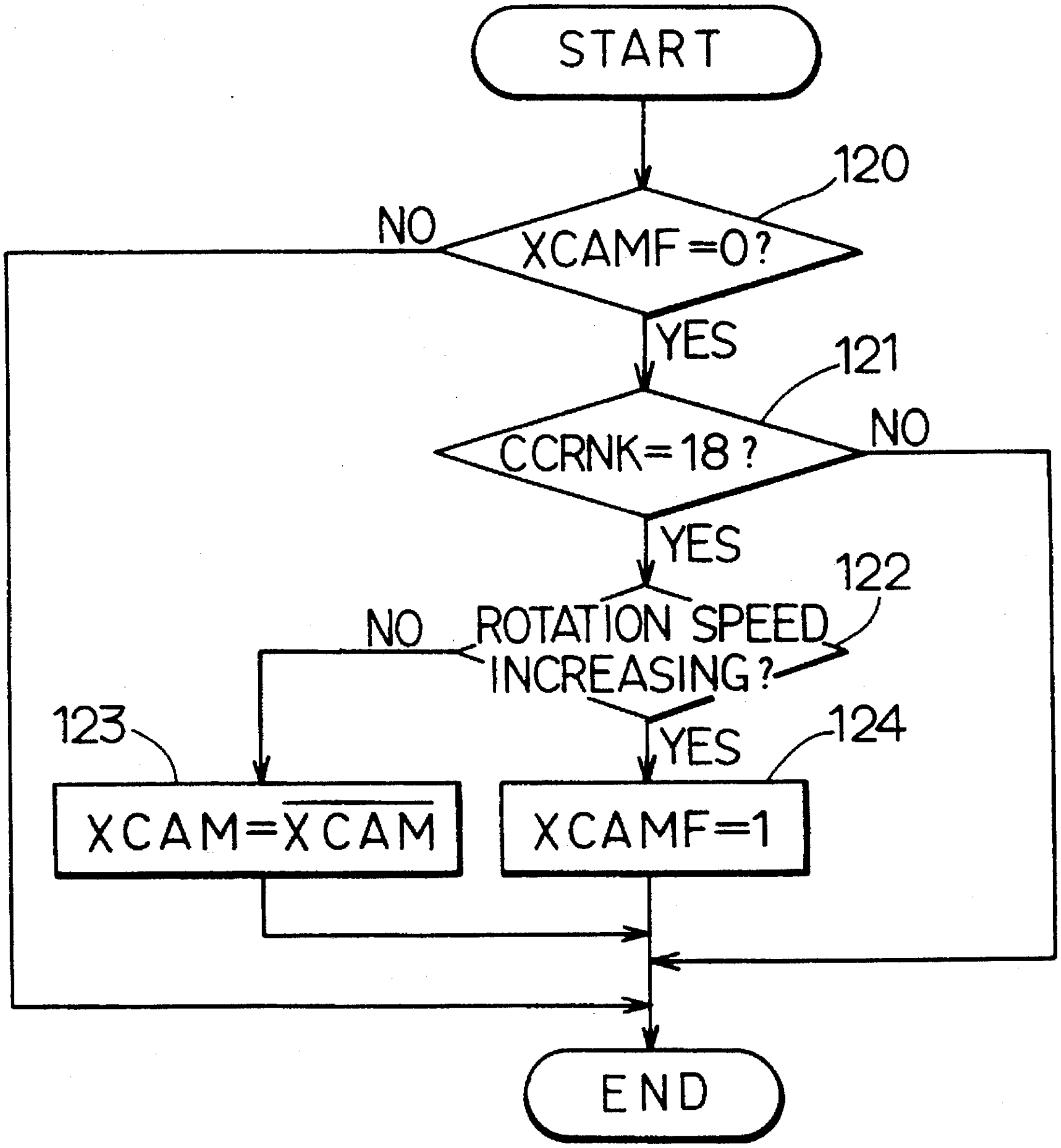
FIG. 7 is a flow chart illustrating a process to determine whether a value of flag XCAM is correct depending on the condition of increasing engine rotational speed.

The flow chart in FIG. 7 shows an interrupt routine for confirming the value of cylinder determination flag XCAM as set by the routine shown in FIG. 6. When this routine is performed, fuel is injected into all cylinders of the engine at the same time and what is then believed to be cylinder #1 is ignited. This routine also is performed by interrupting ECU 33 every time the crankshaft signal from crankshaft sensor 31 is provided to ECU 33, too.

At step 120, it is determined whether a confirming flag XCAMF is "0" or not, that is, whether the value of cylinder determination flag XCAM has been confirmed or not. If the value of cylinder determination flag XCAM has been confirmed (XCAMF=1), subsequent processes are not performed and the routine in FIG. 7 is terminated.

When the value of cylinder determination flag XCAM has not been confirmed (XCAMF=0), the process of ECU 33 proceeds to step 121. At step 121, it is determined whether the value of crankshaft signal counter CCRNK reaches "18" corresponding to an angle of ATDC90° CA in FIG. 4. ATDC90° CA means an angle of 90° CA after TDC1. If the rotation angle of crankshaft 41 has not reached the angle of ATDC90° CA yet, subsequent processes are not performed and the routine in FIG. 7 is terminated. When the rotation angle of crankshaft 41 has reached the angle of ATDC90° CA, at step 122, it is determined whether or not the rotational speed of the engine is increasing. If the rotational speed of the engine is increasing, the set value of cylinder determination flag XCAM is not wrong. Therefore, at step 124, confirming flag XCAMF is set to "1" which shows that the value of cylinder determination flag XCAM has been confirmed. The value of cylinder determination flag XCAM stored in memory 27 is therefore used as is without being inverted. However, when the rotation speed of the engine does not rise even though the angle of crankshaft reaches ATDC90° CA, and the set value of cylinder determination flag XCAM is assumed to be wrong, the value of cylinder determination flag XCAM is therefore inverted at step 123 (that is, "1" is turned into "0", "0" is turned into "1"). As a result, the standard or reference position of the camshaft (e.g., corresponding to cylinder #1) is shifted by 360° CA.

Figure 8:
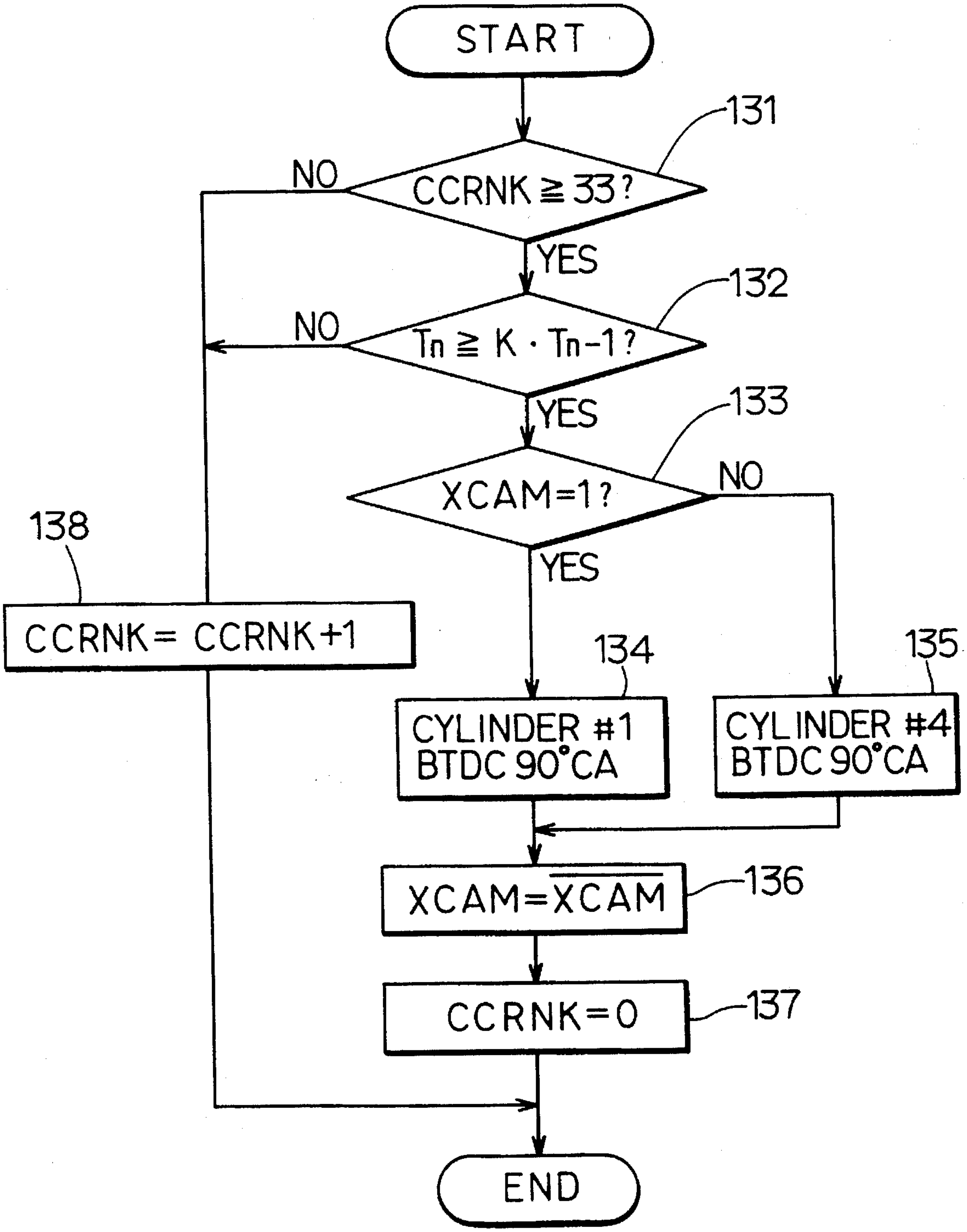
FIG. 8 is a flow chart illustrating a process to determine engine cycle timing state.

Cylinder timing determination is made according to another interrupt routine in FIG. 8, by using the value of the cylinder determination flag XCAM set and confirmed as described above. This routine also is performed by interrupting ECU 33 every time the crankshaft signal from crankshaft sensor 31 is provided to ECU 33.

At step 131, it is determined whether or not the value of crankshaft signal counter CCRNK is "33" or more, that is, whether or not crankshaft 41 has rotated 330° CA or more after the last detection of reference portion 44. If a negative determination is made, the process of ECU 33 proceeds to step 138 and crankshaft signal counter CCRNK is increased by "1". After that, this routine is terminated. As a result, when reverse rotation of crankshaft 41 has happened at engine stoppage, faulty detection of reference portion 44 can be prevented.

When the value of crankshaft signal counter CCRNK reaches "33", the process of ECU 33 proceeds to step 132 from step 131 and it is determined whether or not reference portion 44 is detected depending on whether the equation of $Tn \geqq K \times Tn-1$ is satisfied. Tn is the time interval between the currently-detected crankshaft signal and the last detected crankshaft signal, Tn−1 is the time interval between the last detected crankshaft signal and crankshaft signal yet before last-detected and K is a determination reference value (K>1). If $Tn < K \times Tn-1$ at step 132, it is not reference portion 44, and the process of ECU 33 proceeds to 138 and crankshaft signal counter CCRNK is increased by "1". After that, the routine is terminated.

Figure 9A:
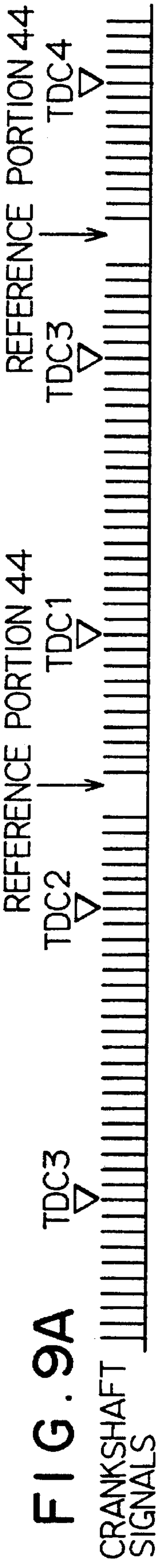
FIGS. 9A and 9B are related timing charts illustrating a relationship between crankshaft angle signals and cylinder determination flag XCAM.
Figure 9B:
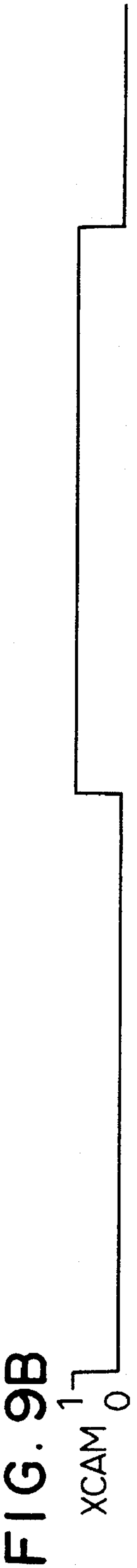

On the other hand, if $Tn \geqq K \times Tn-1$, it is reference portion 44 and the process of ECU 33 proceeds to step 133 from step 132. At step 133, it is determined if the value of cylinder determination flag XCAM is "1". If XCAM="1", the process of ECU 33 proceeds to 134 and the current crank angle is regarded as BTDC 90° CA of cylinder #1. BTDC90° CA means the angle of 90° CA before TDC. If XCAM="0", the process of ECU 33 proceeds to 135 and the current crank angle is regarded as BTDC 90° CA of cylinder #4. After that, the value of cylinder determination flag XCAM is inverted (that is, "1" is turned into "0", "0" is turned into "1"). According to the processes of step 133 to step 135, as shown in FIGS. 9A and 9B, the value of cylinder determination flag XCAM is inverted between "1" and "0" in turn, every time when reference portion 44 is detected (every 360° CA). In other words, BTDC90° CA of cylinder #1 and BTDC90° CA of cylinder #4 are detected alternately every 360° CA. As a result, the cylinder determination can be precisely made with only the crankshaft signal. Whenever reference portion 44 is detected, crankshaft signal counter CCRNK is reset to "0" at step 137. After that, this routine is terminated.

In the first embodiment as described above, it is determined whether or not reverse rotation as shown with arrow A in FIG. 4 has happened based on the number of crankshaft signals counted at the time of engine stoppage, which is stored in memory 27, and the number of crankshaft signals next occurring until reference portion 44 is next first detected the engine is re-started according to the routine in FIG. 6. If reverse rotation of crankshaft 41 across the reference position happened, the reference position of the camshaft is shifted by 360° CA by inverting the value of cylinder determination flag XCAM. If reverse rotation across the reference position did not happen, the value of cylinder determination flag XCAM (corresponding to the reference position of the camshaft) stored in memory 27 is used for engine control as it is. As a result, precise cylinder determination and timing can be made regardless of whether or not reverse rotation as shown with arrow A in FIG. 4 happened.

In addition, it is confirmed whether the value of cylinder determination flag XCAM set in the above-described way is correct in response to whether or not engine rotational speed increases when re-starting the engine, according to the routine in FIG. 7. Therefore, since confirmation of cylinder determination flag XCAM can be performed in two different ways, cylinder determination is made more precisely. However, in the first embodiment, ECU 33 omits performance of the routine in FIG. 7 and confirmation of cylinder determination flag XCAM may be made according to only the routine in FIG. 6.

By contrast, the ECU 33 may omit performance of the routine in FIG. 6. In this case, it may be determined whether or not the value of cylinder determination flag XCAM is correct depending on whether engine rotational speed increases when re-starting the engine (by use of the value of cylinder determination flag XCAM stored in memory 27 at the time of engine stoppage according to the routine in FIG. 7).

Figure 10:
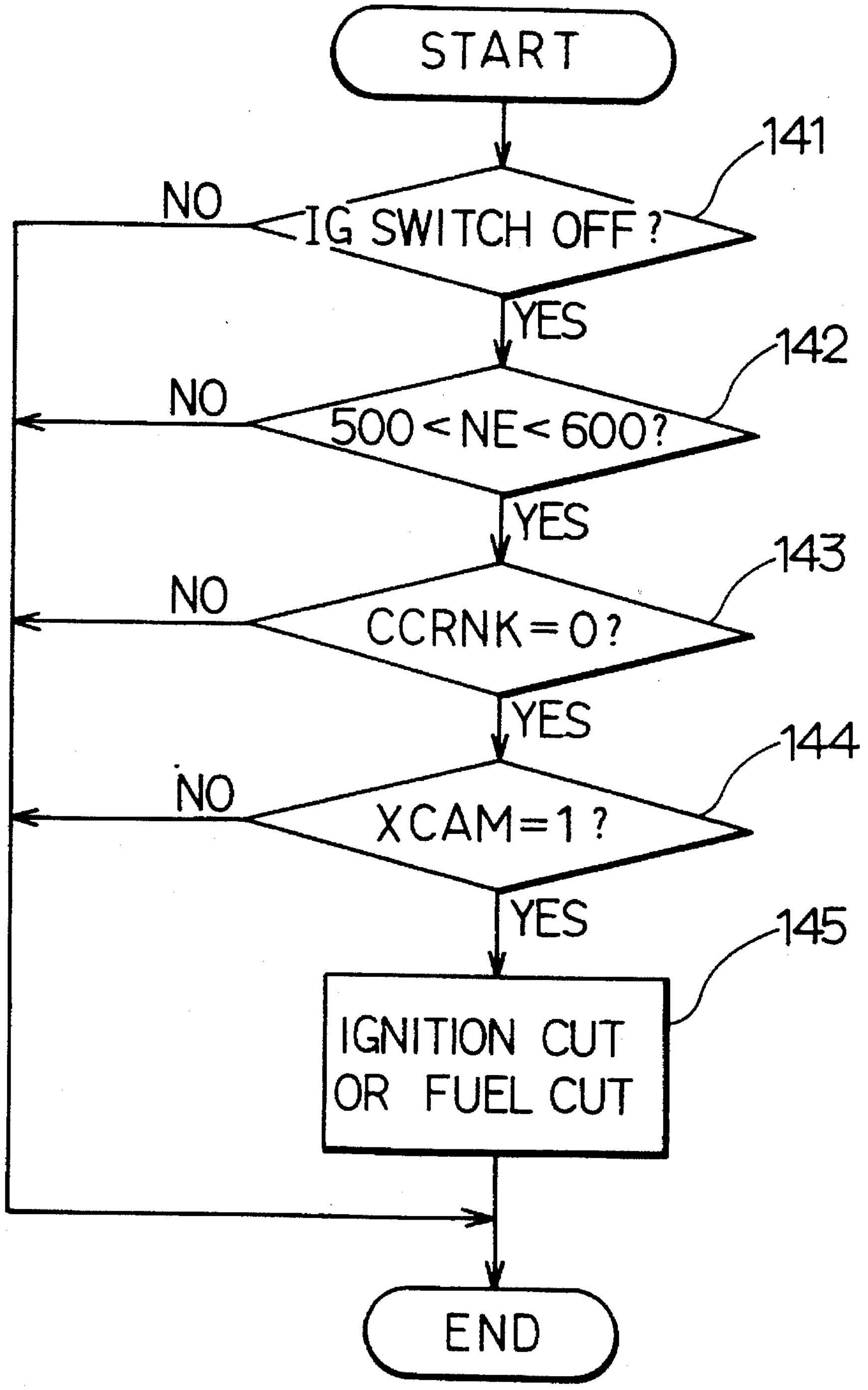
FIG. 10 is a flow chart illustrating a process to forcibly stop an engine in a second embodiment of the present invention.

In the first embodiment described above, it is determined whether or not reverse rotation as shown with arrow A in FIG. 4 happened at the time of engine stoppage. However, such reverse rotation of the engine may be prevented by forcibly stopping the engine so that reverse rotation does not happen. Hereinafter, a second embodiment of the present invention will be explained with reference to FIG. 10. The routine in FIG. 10 is performed instead of the routine in FIG. 6 and acts as a forcible engine stop device. The processes other than the routine in FIG. 10 are the same as those in the first embodiment.

The exemplary routine in FIG. 10 also is performed by interrupting ECU 33 every time when the crankshaft signal from crankshaft sensor 31 is provided to ECU 33. At step 141, it is determined whether or not an ignition switch (IG SW) is turned off. If the IG SW is not turned off, subsequent processes are not performed and the routine is terminated. When the IG SW is turned on, the process of ECU 33 proceeds to step 142 from step 141 and it is determined whether or not the engine rotational speed NE is within a predetermined lower speed range (e.g., 500–600 rpm). If the relationship $500<NE<600$ is not satisfied, this routine is terminated. If $500<NE<600$, the process of ECU 33 proceeds to step 143 and it is determined whether or not the value of crankshaft signal counter CCRNK is "0", that is, whether or not crankshaft 41 has yet rotated up to a predetermined position (e.g., the detection position for reference portion 44). If CCRNK≠0, this routine is terminated. If CCRNK=0, the process of ECU 33 proceeds to step 144 and it is determined whether the value of cylinder determination flag XCAM is "1". If XCAM≠1, this routine is terminated. If XCAM=1, the process of ECU 33 proceeds to step 145 and an ignition cutting operation or fuel cutting operation is executed to forcibly stop the engine so that reverse rotation does not happen. In other words, when engine rotational speed NE is within the predetermined lower speed range (step 142) and crankshaft 41 reaches a predetermined crank angle (steps 143 and 144), the engine is forcibly stopped at a position whereat reverse rotation does not happen.

The reference position of the camshaft of the forcibly stopped engine (equal to cylinder determination flag XCAM) is stored and held in memory 27. When the engine is re-started the value of cylinder determination flag XCAM stored in memory 27 is used. In this case, since the forcible stop routine in FIG. 10 prevents reverse rotation of the engine, the cylinder determination can be precisely made by the value of cylinder determination flag XCAM already stored in memory 27.

Figure 11:
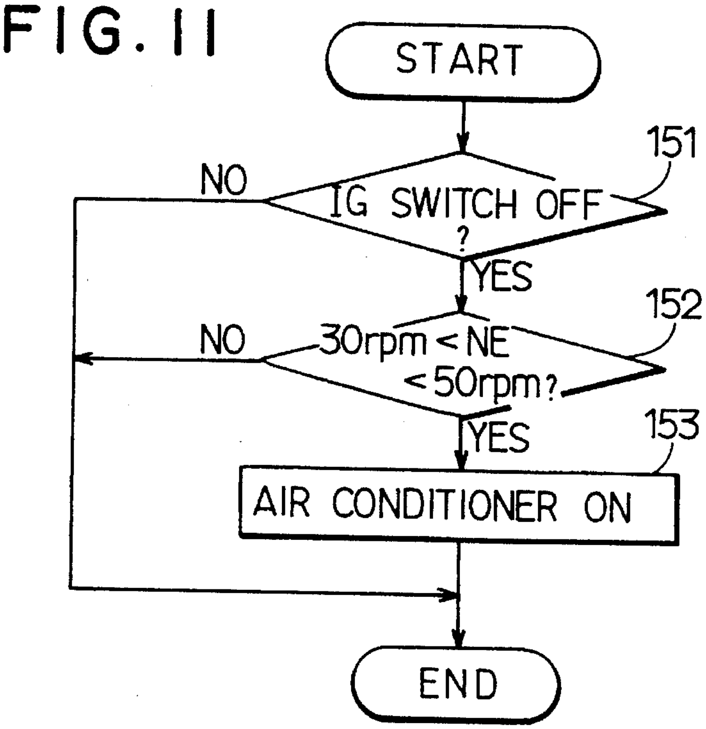
FIG. 11 is a flow chart illustrating a process to forcibly stop an engine in a third embodiment of the present invention.

Forcible stopping of the engine also can be realized by driving at least one auxiliary machine (e.g., such as an air conditioner, an alternator and a torque converter which are loads against the engine when the engine stops), rather than executing the ignition cutting or fuel cutting operation of FIG. 10. Hereinafter, a third embodiment of the present invention embodying it will be explained with reference to FIG. 11. The routine in FIG. 11 is performed instead of the routine in FIG. 6 and also may serve as a forcible stop mechanism. The processes other than the routine in FIG. 11 are the same as those in the first embodiment.

The interrupt routine in FIG. 11 also is performed by interrupting ECU 33 every time when the crankshaft signal from crankshaft sensor 31 is provided to ECU 33. At step 151, it is determined whether or not an ignition switch (IG SW) is turned off. If the IG SW is not turned off, subsequent processes are not performed and the routine is terminated. When the IG SW is turned on, the process of ECU 33 proceeds to step 152 from step 151 and it is determined whether or not the engine rotational speed NE is within a lower speed range (e.g. 30–50 rpm) immediately before engine stoppage. If the relation of $30<NE<50$ is not satisfied, this routine is terminated. If $30<NE<50$, the process of ECU 33 proceeds to step 153 and air conditioner 25 is turned on. The engine is thereat forcibly stopped due to the load of air conditioner 25. In this case, the load of other auxiliary machinery such as the alternator or torque converter 26 alternatively may be imposed on the engine. Further, loads of more than one auxiliary machinery can be simultaneously imposed on the engine.

When the forcible stop routine in FIG. 10 or FIG. 11 is performed, the increasing rotational speed routine in FIG. 7 may be omitted.

Figure 12:
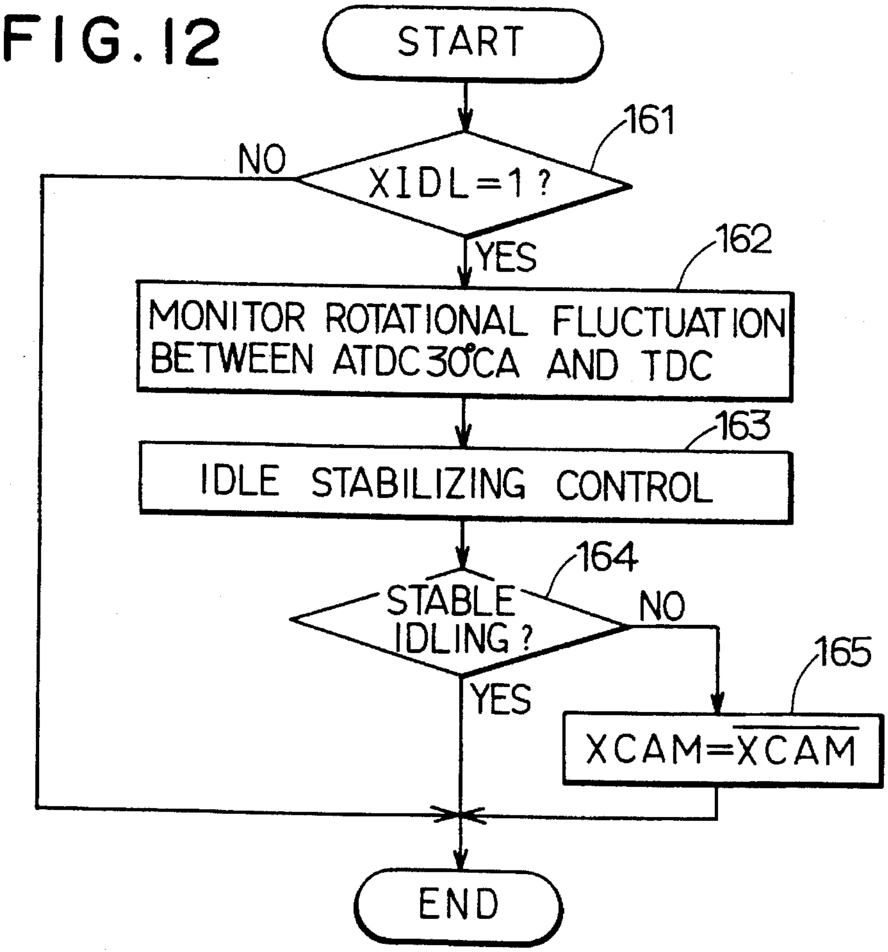
FIG. 12 is a flow chart illustrating the setting of flag XCAM by using idle stabilizing control according to a fourth embodiment of the present invention.
Figure 13:
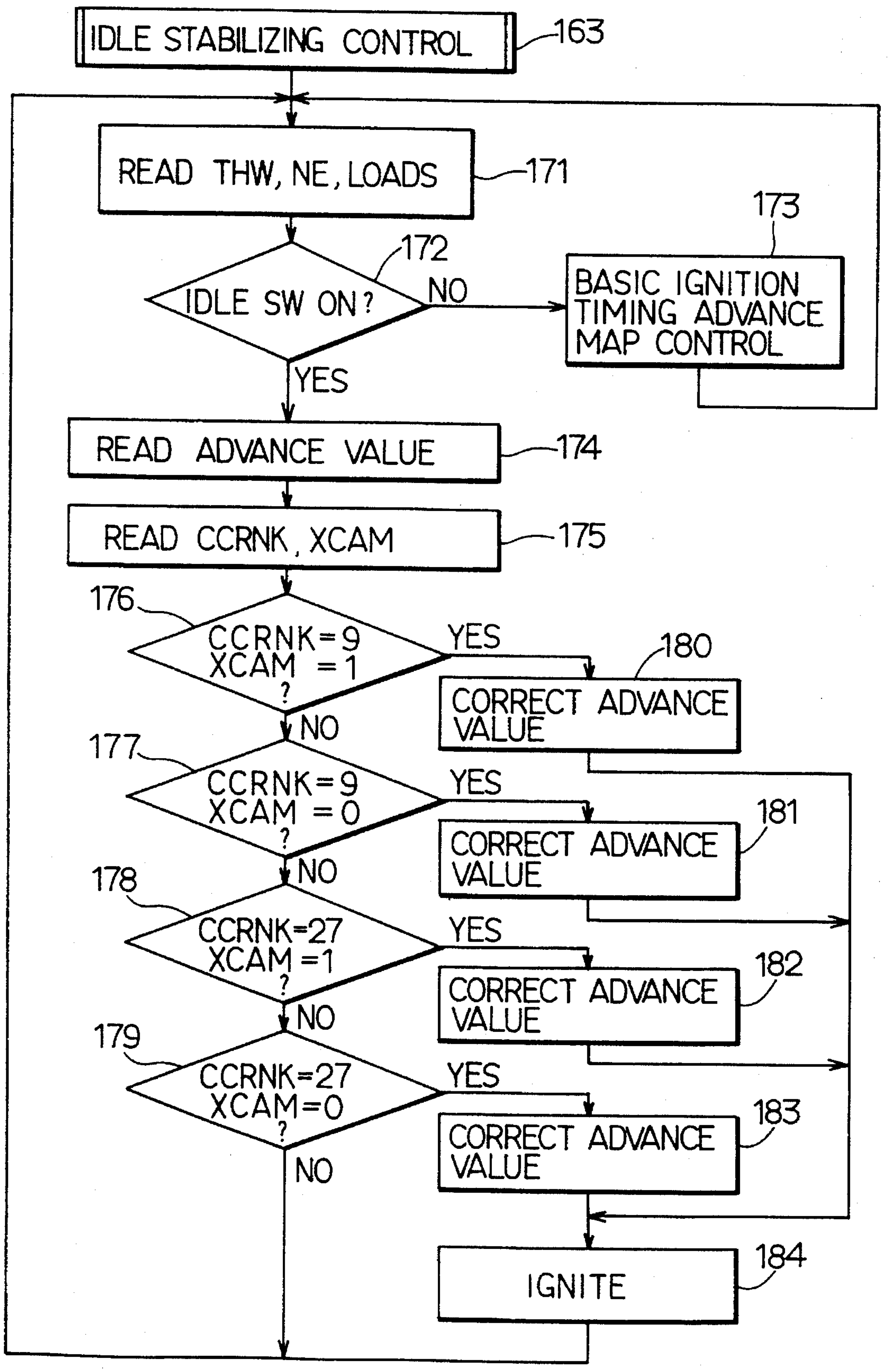
FIG. 13 is a flow chart illustrating an idle stabilizing control routine according to the fourth embodiment of FIG. 12.

Idle stabilizing control shown in FIG. 12 and FIG. 13 may be performed to confirm whether or not the value of cylinder determination flag XCAM is correct. Idle stabilizing control may be substituted for the increasing rotational speed routine in FIG. 7. Hereinafter, a fourth embodiment of the present invention relating to idle stabilizing control will be described. In the fourth embodiment, until the cylinder determination is made, fuel is injected to all cylinders at the same time and a group cylinders (#1 and #4, #2 and #3) are ignited at the same time, respectively.

The routine in FIG. 12 also is performed by interrupting ECU 33 every time the crankshaft signal from crankshaft sensor 31 is provided to ECU 33. At step 161, it is determined whether or not the engine is driven at an idling state depending on whether the value of an idle determination flag XIDL is "1". If XIDL=0, subsequent processes are not performed and this routine is terminated. If XIDL=1, the process of ECU 33 proceeds to step 162 and rotational fluctuations between ATDC30° CA and the TDC are monitored at each cylinder based on the crankshaft signals. Next, idle stabilizing control is performed at step 163. Idle stabilizing control is performed according to a routine in FIG. 13 and thus performs as an idle stabilizing mechanism.

At step 171, an engine coolant temperature THW, an engine rotational speed NE and loads against the engine are input to ECU 33. At step 172, it is determined whether or not an idle switch is on. The idle switch is turned on when the engine is to be driven at an idling state. If the idle switch is off, the process of ECU 33 proceeds to step 173 and a routine for basic ignition timing advance map control. After step 173, the process of ECU 33 returns to step 171. Basic ignition timing advance map control is ignition timing control performed at the time of a non-idling state (that is, when engine rotational speed NE is higher than the idling state). In basic ignition timing advance map control, basic ignition timing is determined based on engine loads and engine rotational speed NE according to a predetermined map. In addition, basic ignition timing is corrected in response to engine coolant temperature THW. Ignition signals corresponding to the corrected basic ignition timing are then given to igniter 37.

On the other hand, if the idle switch is on, the process of ECU 33 proceeds to step 174 from step 172. At step 174, an ignition timing advance value at the time of the idling state is determined based on an advance map responsive to engine coolant temperature THW, engine rotational speed NE and engine loads. Next, at step 175, the values of crankshaft signal counter CCRNK and cylinder determination flag XCAM are read out of memory 27. At step 176, it is determined whether CCRNK=9 and XCAM=1 or not (that is, whether or not it corresponds to the TDC of specific cylinder #1). If a negative determination is made at step 176, it is determined at step 177 whether CCRNK=9 and XCAM=0 or not (that is, whether or not it corresponds to the TDC of cylinder #4). If a negative determination is also made at step 177, it is determined at step 178 whether CCRNK=27 and XCAM=1 or not (that is, whether or not it corresponds to the TDC of cylinder #3). If a negative determination is also made at step 178, it is determined at step 179 whether CCRNK=27 and XCAM=0 or not (that is, whether or not it corresponds to the TDC of cylinder #2).

If the values of crank axis signal counter CCRNK and cylinder determination flag XCAM do not correspond to the TDCs of all cylinders (that is, if the determinations at steps 176 to 179 are all negative), the process of ECU 33 returns to step 171 and the processes described above are performed repeatedly. If one of the determinations at steps 176 to 179 is affirmative, the process of ECU 33 proceeds to one of steps 180 to 183 corresponding to the step at which the affirmative determination was made. At steps 180 to 183, the ignition timing advance value is corrected. At step 184, ignition timing is controlled responsive to the corrected ignition timing advance value. Idle stabilizing control is performed by repeating the above-described processes.

Figure 14A:
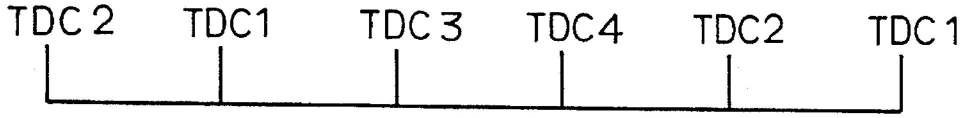
FIGS. 14A to 14C are timing charts illustrating an effect of idle stabilizing control which can restrict fluctuations of engine rotational speed.
Figure 14B:
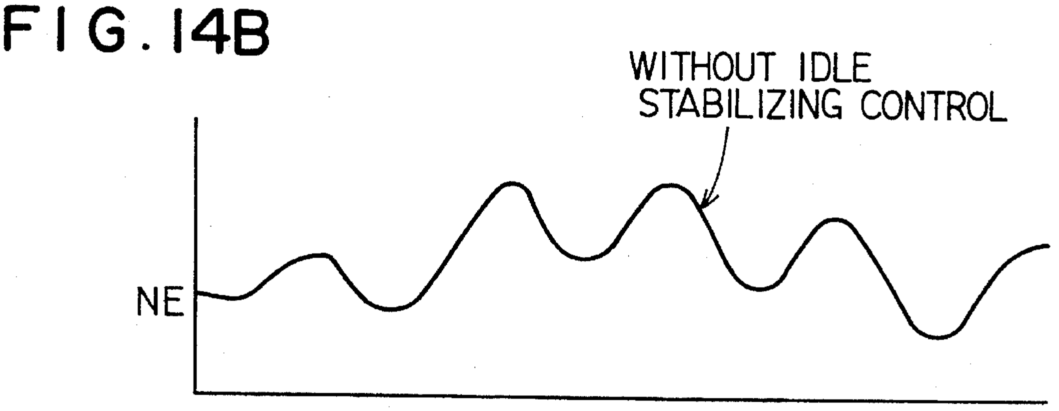
Figure 14C:
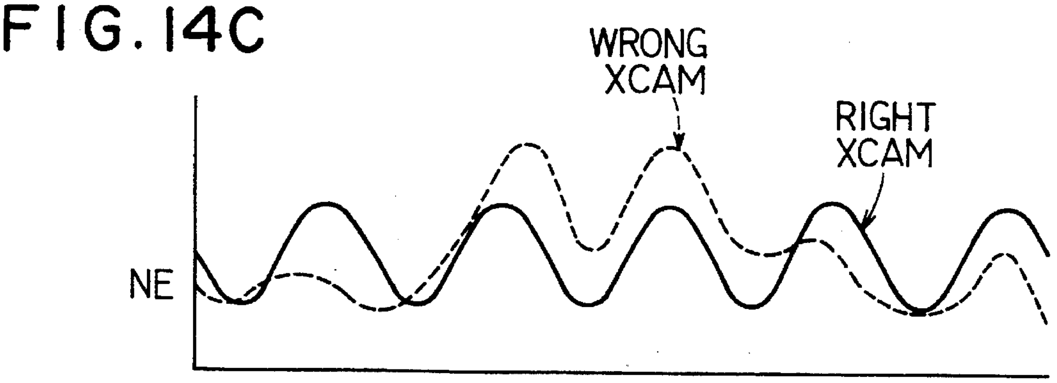

When performing such idle stabilizing control, as shown in FIG. 14C, if the value of cylinder determination flag XCAM is correct, fluctuation of engine rotational speed NE is relatively small. On the contrary, if the value of cylinder determination flag XCAM is wrong, fluctuation of engine rotational speed NE is relatively large and idle rotational speed of the engine is not stabilized.

After performing idle stabilizing control, the process of ECU 33 proceeds to step 164 in FIG. 12. At step 164, it is determined whether or not the value of cylinder determination flag XCAM is correct depending on whether or not the idle rotational speed of the engine has been stabilized. A determination of whether the idle rotational speed of the engine has been stabilized can be made in various ways. For example, after adding up fluctuations from average idling rotational speeds at all cylinders, the value added to the fluctuations is compared with a predetermined value. Another method calculates differentials among idle rotation speeds at all cylinders and adds them together. The value added to the differentials is compared with a predetermined value. In either case, if the added value is greater than a predetermined value, it is determined that the idle rotational speed of the engine is unstable and the value of cylinder determination flag XCAM is wrong. In this case, the process of ECU 33 proceeds to step 165 and the value of cylinder determination flag XCAM is inverted (that is, "1" is turned into "0", "0" is turned into "1"). On the other hand, when it is determined that the idle rotational speed of the engine is stable at step 164, the value of cylinder determination flag XCAM is determined not wrong, and the value of cylinder determination flag XCAM stored in memory 27 is used for the engine control without being inverted.

In this case, the value of cylinder determination flag XCAM used for idle stabilizing control at step 163 has been set by the routine in FIG. 6. However, it is possible that the routine in FIG. 6 is omitted and only idle stabilizing control is performed. In this case, before idle stabilizing control is performed, cylinder determination flag XCAM is set to "1" (or "0") temporarily. Idle stabilizing control is performed by using the cylinder determination flag XCAM set to "1" (or "0") temporarily. If the idle rotation speed is unstable by idle stabilizing control, the value of cylinder determination flag XCAM is inverted.

Figure 15:
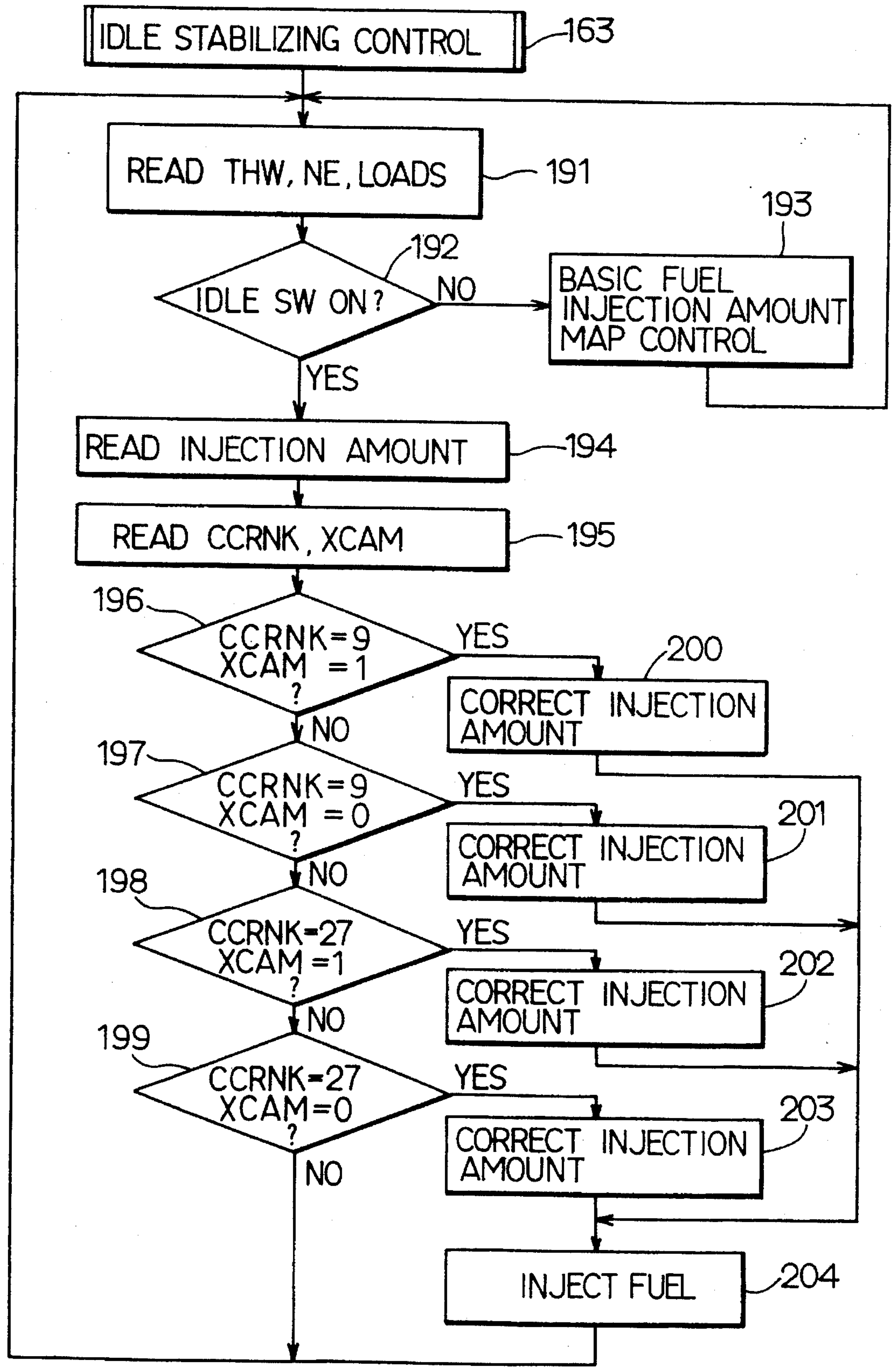
FIG. 15 is a flow chart illustrating an idle stabilizing control routine according to a fifth embodiment of the present invention.

In idle stabilizing control of the fourth embodiment, ignition timing advance value is controlled to stabilize the idle rotational speed. However, idle stabilizing control can be performed by controlling the amounts of fuel injection as shown in FIG. 15. Hereinafter, a fifth embodiment of the present invention will be explained with reference to FIG. 15. The routine in FIG. 15 thus serves as an idle stabilizing mechanism.

At step 191, a temperature of an engine coolant THW, an engine rotational speed NE and loads against the engine are input to ECU 33. At step 192, it is determined whether an idle switch is on or not. The idle switch is turned on when the engine is to be driven at an idling state. If the idle switch is off, the process of ECU 33 proceeds to step 193 and a routine for basic fuel injection amount map control is performed. After step 193, the process of ECU 33 returns to step 191. Basic fuel injection amount map control is fuel injection amount control performed at the time of a non-idling state (that is, when the rotational speed of the engine is higher than that of the idling state). In basic fuel injection amount map control, a basic amount of fuel injection is determined based on engine loads and engine rotational speed NE according to a predetermined map. In addition, the basic amount of fuel injection is corrected in response to engine coolant temperature THW. Fuel is injected according to the corrected basic amount of fuel injection.

On the other hand, if the idle switch is on, the process of ECU 33 proceeds to step 194 from step 192. At step 194, an amount of fuel injection at the time of the idling state is determined based on an injection amount map responsive to engine coolant temperature THW, engine rotational speed NE and engine loads. Next, at step 195, the values of crankshaft signal counter CCRNK and cylinder determination flag XCAM are read out of memory 27. At steps 196 to 199, it is determined whether or not these correspond to any TDCs of cylinders #1 to #4. If these do not correspond to the any TDCs of cylinders #1 to #4 (if the determinations at steps 196 to 199 are all negative), the process of ECU 33 returns to step 191 and the processes described above are performed repeatedly. If one of the determinations at steps 196 to 199 is affirmative, the process of ECU 33 proceeds to one of steps 200 to 203 corresponding to the step at which the affirmative determination was made. At steps 200 to 203, the amount of fuel injection is corrected. At step 204, fuel is injected into the cylinder. Idle stabilizing control is performed by repeating the above-described processes.

After performing idle stabilizing control, the process of ECU 33 proceeds to step 164 in FIG. 12. At step 164, it is determined whether or not the value of cylinder determination flag XCAM is correct depending on whether or not the idle rotational speed of the engine has been stabilized. If the idle rotational speed of the engine is unstable (the value of cylinder determination flag XCAM is wrong), the process of ECU 33 proceeds to step 165 and the value of cylinder determination flag XCAM is inverted.

In this case, the value of cylinder determination flag XCAM used for idle stabilizing control at step 163 has been set by the routine in FIG. 6. However, it is possible that the routine in FIG. 6 is omitted and only idle stabilizing control shown in FIG. 12 and FIG. 15 is performed. In this case, before idle stabilizing control is performed, cylinder determination flag XCAM is set to "1" (or "0") temporarily. Idle stabilizing control is performed by using the cylinder determination flag XCAM set to "1" (or "0") temporarily. If the idle rotation speed is unstable regardless of idle stabilizing control, the value of cylinder determination flag XCAM is inverted.

In the fourth and fifth embodiments, fuel is injected to all cylinders at the same time until the cylinder determination is made. However, fuel may be injected to each cylinder group (#1 and #4, #2 and #3) at the same time. The embodiments described above apply the present invention to an exemplary four cylinder engine. However, the present invention can be applied to a six cylinder engine, an eight cylinder engine and so on.

According to the present invention, when the engine is re-started, it is determined whether or not reverse rotation of the engine as shown with arrow A in FIG. 4 happened at the time of last engine stoppage based on the number of crankshaft signals stored in a storing device and the number of crankshaft signals next occurring until the reference position of the crankshaft is first detected. If such reverse rotation happened, the reference position of the camshaft is shifted by 360° CA. Therefore, regardless of whether such reverse rotation of the crank axis happened or not, cylinder timing determination is precisely made.

Further, reverse rotation of the engine can be prevented by forcibly stopping the crankshaft to a position at which reverse rotation does not happen. In such circumstances, a cylinder timing determination can be precisely made in response to the reference position of the camshaft already stored in the storing device while minimizing deterioration of the drivability of the engine.

Furthermore, it can be determined whether an initial provisional reference position of the camshaft is correct or not, depending on increasing engine rotational speed when the engine is re-started (using the initial provisional reference position of the camshaft. As a result, cylinder timing determination can be precisely made without a camshaft sensor while minimizing deterioration of the drivability of the engine.

In addition, according to the present invention, when the engine is driven at an idling state based on a provisional reference position of the camshaft, ignition timing is controlled so that idle rotational speed is stabilized. At this same time, it can be determined whether the provisional reference position of the camshaft is correct depending on the degree of fluctuations in engine rotational speed. Therefore, cylinder timing determination can be precisely made without a camshaft sensor while minimizing deterioration of the drivability of the engine.

In the present invention, idle stabilizing control can be performed by controlling amounts of fuel injection instead of controlling ignition timings. In this case, it is determined whether a provisional reference position of the camshaft is correct depending on the degree of fluctuation of engine rotational speed when the amounts of fuel injection are controlled to stabilize idle rotational speed. Therefore, cylinder timing determination can be precisely made without a camshaft sensor while minimizing deterioration of the drivability of the engine.

Those skilled in the art will recognize that various modifications and variations may be made in the exemplary embodiments while yet retaining many of the novel advantages thereof. Accordingly all such modifications and variations are intended to be included within the scope of the following claims.

What is claimed is:

1. An engine cycle timing and synchronizing system for an engine having a plurality of cylinders which are each ignited in predetermined order during two rotations of a crankshaft at least two pistons of which reciprocate at a common phase, said system comprising:

signal generating means for generating pulse signals at constant rotational intervals of the crankshaft and for generating a reference signal at a predetermined crank angle of said crankshaft;

detecting means for detecting a reference position of said crankshaft based on said reference signal;

storing means for storing the number of pulse signals occurring after said reference position of said crankshaft is detected and for storing data relating to whether or not the reference position of said crankshaft which to be next detected corresponds to a specific predetermined cylinder;

reverse rotation determination means for determining whether said crankshaft reversely rotated from a position beyond said reference position to a position before said reference position at the time of last engine stoppage using said number of pulse signals stored in said storing means and the number of pulse signals occurring until the reference position of the crankshaft is next detected again after engine re-start;

data correcting means for correcting said stored data so that said reference position of said crankshaft corresponding to said specific predetermined cylinder is effectively shifted by one rotation of said crankshaft when said reverse rotation determination means determines that said crankshaft reversely rotated across said reference position; and means for determining whether a cylinder is the specific predetermined cylinder using the number of pulse signals occurring after passage of said reference position of said crankshaft corresponding to said specific cylinder.

2. An engine cycle timing and synchronizing system for an engine having a plurality of cylinders which are each ignited in predetermined order during two rotations of a crankshaft, and at least two pistons of which reciprocate at a common phase, the system comprising:

signal generating means for generating pulse signals at constant rotational intervals of the crankshaft and for generating a reference signal at a predetermined crank angle of said crankshaft;

detecting means for detecting a reference position of said crankshaft based on said reference signal;

forcible stop means for causing said crankshaft to forcibly stop at a position which does not reversely rotate when the engine stops;

storing means for storing the number of pulse signals occurring after said reference position of said crankshaft corresponding to a specific cylinder condition which appears once during two rotations of said crankshaft; and means for identifying a cylinder responsive to the number of pulse signals after passage of said reference position of said crankshaft corresponding to said specific cylinder.

3. An engine cycle timing and synchronizing system for an engine having a plurality of cylinders which are each ignited in predetermined order during two rotations of a crankshaft, and at least two pistons of which reciprocate at a common phase, the system comprising:

signal generating means for generating pulse signals at constant rotational intervals of a crankshaft and for generating a reference signal at a predetermined crank angle of said crankshaft;

detecting means for detecting a reference position of said crankshaft based on said reference signal;

setting means for setting a provisional reference position of said crankshaft corresponding to a specific cylinder condition which appears once during each two rotations of said crankshaft;

determination means for determining whether or not said provisional reference position of said crankshaft is correct depending on whether engine rotation increases when said engine is started using said provisional reference position of said crankshaft;

correcting means for correcting said provisional reference position of said crankshaft so as to be shifted by one rotation of said crankshaft when the determination means determines that said provisional reference position of said crankshaft is not correct; and means for making a cylinder determination responsive to the number of pulse signals occurring after passage of said reference position of said crankshaft corresponding to said specific cylinder.

4. An engine cycle timing and synchronizing system for an engine as in claim 3, wherein said setting means comprises:

storing means for storing the number of pulse signals occurring after said reference position of said crankshaft is detected and for storing data relating to whether or not the reference position of said crankshaft to be detected next time corresponds to a specific cylinder;

reverse rotation determination means for determining whether said crankshaft reversely rotated from a position beyond said reference position to a position before said reference position at the time of last engine stoppage, based on said number of pulse signals stored in said storing means and the number of pulse signals occurring until the reference position of the crankshaft is next detected again; and data correcting means for correcting said data so that said reference position of said crankshaft corresponding to said specific cylinder is shifted by one rotation of said crankshaft when said reverse rotation determination means determines that said crankshaft reversely rotated across said reference position.

5. An engine cycle timing and synchronizing system for an engine as in claim 3, wherein said setting means comprises:

forcible stop means for causing said crankshaft to forcibly stop at a position which does not reversely rotate when the engine stops; and storing means for storing said reference position of said crankshaft corresponding to a specific cylinder condition which appears once during each two rotations of said crankshaft at the time of last engine stoppage as said provisional reference position of said crankshafts.

6. An engine cycle timing and synchronizing system for an engine having a plurality of cylinders which are each ignited in predetermined order during two rotations of a crankshaft, and at least two pistons of which reciprocate at a common phase, the system comprising:

signal generating means for generating pulse signals at constant rotational intervals responsive to rotations of a crankshaft and for generating a reference signal at a predetermined crank angle of said crankshaft;

detecting means for detecting a reference position of said crankshaft based on said reference signal;

setting means for setting a provisional reference position of said crankshaft corresponding to a specific cylinder condition which appears once during each two rotations of said crankshaft;

idle stabilizing means for controlling ignition timings for said cylinders so that an idling rotation speed is stabilized when said engine is driven at an idling state based on said provisional reference position of said crankshaft;

determination means for determining whether or not said provisional reference position of said crankshaft is correct depending on the degree of fluctuation of engine rotational speed when said idle stabilizing means controls said ignition timings based on said provisional reference position of said crankshaft;

correcting means for correcting said provisional reference position of said crankshaft so as to be shifted by one rotation of said crankshaft when determination means determines that said provisional reference position of said crankshaft is not correct; and means for making a cylinder determination responsive to the number of pulse signals occurring after passage of said reference position of said crankshaft corresponding to said specific cylinder.

7. An engine cycle timing and synchronizing system for an engine having a plurality of cylinders which are each ignited in predetermined order during two rotations of a crankshaft and at least two pistons of which reciprocate at a common phase, the system comprising:

signal generating means for generating pulse signals at constant rotational intervals responsive to rotations of the crankshaft and for generating a reference signal at a predetermined crank angle of said crankshaft;

detecting means for detecting a reference position of said crankshaft based on said reference signal;

setting means for setting a provisional reference position of said crankshaft corresponding to a specific cylinder condition which appears once during each two rotations of said crankshaft;

idle stabilizing means for controlling amounts of fuel injection for said cylinders so that an idling rotation speed is stabilized when said engine is driven at an idling state based on said provisional reference position of said crankshaft;

determination means for determining whether or not said provisional reference position of said crankshaft is correct depending on the amount of fluctuation in engine rotational speed when said idle stabilizing means controls said amounts of fuel injection based on said provisional reference position of said crankshaft;

correcting means for correcting said provisional reference position of said crankshaft so as to be shifted by one rotation of said crankshaft when the determination means determines that said provisional reference position of said crankshaft is not correct; and means for making a cylinder determination responsive to the number of pulse signals occurring after passage of said reference position of said crankshaft corresponding to said specific cylinder.

8. An engine cycle timing and synchronizing apparatus for use with a multi-cylinder four-cycle reciprocating piston engine having an engine combustion cycle that occurs during two complete revolutions of a crankshaft while a mechanically coupled valve-operating camshaft undergoes a single revolution, said apparatus comprising:

a wheel having angularly spaced detectable structures therearound, said wheel being attached to rotate with a crankshaft and having a reference portion that is of uniquely different structure than the remainder of the wheel;

an electrical signal transducer mounted adjacent the path of said wheel as it rotates and disposed to produce electrical signals representing the passage thereby of said wheel structures;

a synchronizing signal memory storing an indication of the relative phase of said crankshaft rotation to an engine combustion cycle;

an electrical signal counter and memory connected to count and store the number of said electrical signals occurring after passage of said reference portion just prior to engine stoppage and the number of said electrical signals occurring before the next passage of said reference portion just after engine restart; and an electrical signal processor connected to update said synchronizing signal memory upon engine restart based on the content of said electrical signal counter and memory.

9. An engine cycle timing and synchronizing apparatus as in claim 8 wherein said signal processor includes:

means for determining whether said reference portion has undergone reverse motion past said sensor upon engine stoppage; and means for adjusting engine cycle timing with respect to a camshaft by substantially 360° of crankshaft rotation, if needed, upon engine restart to maintain synchronization with the camshaft.

10. An engine cycle timing and synchronizing apparatus as in claim 9 wherein said means for determining comprises:

means for storing the number of said signals occurring after the last said reference portion passage prior to engine stoppage;

means for adding such stored number to the number of said signals occurring before the next said reference portion passage upon engine restart; and means for comparing the total added together number of said signals to a predetermined threshold value to determine whether said reverse motion has occurred.

11. An engine cycle timing and synchronizing apparatus as in claim 8 further including:

means for forcibly stopping said engine upon engine turn-off at a point in the combustion cycle that substantially prevents reverse rotation of said reference portion past said sensor upon engine stoppage.

12. An engine cycle timing and synchronizing method for use with a multi-cylinder four-cycle reciprocating piston engine having an engine combustion cycle that occurs during two complete revolutions of a crankshaft while a mechanically coupled valve-operating camshaft undergoes a single revolution, said method comprising:

rotating a wheel having angularly spaced detectable structures therearound together with a crankshaft, said wheel having a reference portion that is of uniquely different structure than the remainder of the wheel;

transducing an electrical signal from said wheel as it rotates to produce electrical signals representing the passage thereby of said wheel structures;

storing an indication of the relative phase of said crankshaft rotation to an engine combustion cycle;

counting and storing the number of said electrical signals occurring after passage of said reference portion just prior to engine stoppage and the number of said electrical signals occurring before the next passage of said reference portion just after engine restart; and updating said stored indication of relative phase upon engine restart based on the counted and stored number of said electrical signals.

13. An engine cycle timing and synchronizing method as in claim 12 wherein said updating includes:

determining whether said reference portion has undergone reverse motion past said sensor upon engine stoppage; and adjusting engine cycle timing with respect to a camshaft by substantially 360° of crankshaft rotation, if needed, upon engine restart to maintain synchronization with the camshaft.

14. An engine cycle timing and synchronizing method as in claim 13 wherein said determining comprises:

storing the number of said signals occurring after the last said reference portion passage prior to engine stoppage;

adding such stored number to the number of said signals occurring before the next said reference portion passage upon engine restart; and comparing the total added together number of said signals to a predetermined threshold value to determine whether said reverse motion has occurred.

15. An engine cycle timing and synchronizing method as in claim 12 further comprising:

forcibly stopping said engine upon engine turn-off at a point in the combustion cycle that substantially prevents reverse rotation of said reference portion past said sensor upon engine stoppage.

16. An engine cycle timing and synchronizing method for use with a multi-cylinder four-cycle reciprocating piston engine having an engine combustion cycle that occurs during two complete revolutions of a crankshaft while a mechanically coupled valve-operating camshaft undergoes a single revolution, said method comprising the steps of:

generating first signals representing rotational movements of a crankshaft past a sensor;

generating a reference signals representing passage of a predetermined reference portion of said crankshaft with respect to said sensor;

determining whether said reference crankshaft portion has undergone reverse motion past said sensor upon engine stoppage; and adjusting engine cycle timing with respect to a camshaft by substantially 360° of crankshaft rotation, if needed, upon engine restart in response to said determining step to maintain synchronization with the camshaft.

17. An engine cycle timing and synchronizing method as in claim 16 wherein said determining step includes:

storing the number of said first signals occurring after the last said reference signal prior to engine stoppage;

adding such stored number to the number of said first signals occurring before the next said reference signal upon engine restart; and comparing the total added together number of said first signals to a predetermined threshold value to determine whether said reverse motion has occurred.

18. An engine cycle timing and synchronizing method for use with a multi-cylinder four-cycle reciprocating piston engine having an engine combustion cycle that occurs during two complete revolutions of a crankshaft while a mechanically coupled valve-operating camshaft undergoes a single revolution, said method comprising:

generating first signals representing rotational movements of a crankshaft past a sensor;

generating a reference signals representing passage of a predetermined reference portion of said crankshaft with respect to said sensor;

forcibly stopping said engine upon engine turn-off at a point in the combustion cycle that substantially prevents reverse rotation of said reference crankshaft portion past said sensor upon engine stoppage;

storing the number of said first signals occurring prior to engine stoppage and after the last reference signal prior to engine stoppage, and using said stored number of first signals upon engine re-start to maintain synchronization between a camshaft and engine cycle timing as otherwise determined by said first and reference signals.

19. An engine cycle timing and synchronizing apparatus for use with a multi-cylinder four-cycle reciprocating piston engine having an engine combustion cycle that occurs during two complete revolutions of a crankshaft while a mechanically coupled valve-operating camshaft undergoes a single revolution, said apparatus comprising the steps of:

means for generating first signals representing rotational movements of a crankshaft past a sensor;

means for generating a reference signals representing passage of a predetermined reference portion of said crankshaft with respect to said sensor;

means for determining whether said reference crankshaft portion has undergone reverse motion past said sensor upon engine stoppage; and means for adjusting engine cycle timing with respect to a camshaft by substantially 360° of crankshaft rotation, if needed, upon engine restart in response to said means for determining to maintain synchronization with the camshaft.

20. An engine cycle timing and synchronizing apparatus as in claim 19 wherein said means for determining includes:

means for storing the number of said first signals occurring after the last said reference signal prior to engine stoppage;

means for adding such stored number to the number of said first signals occurring before the next said reference signal upon engine restart; and means for comparing the total added together number of said first signals to a predetermined threshold value to determine whether said reverse motion has occurred.

21. An engine cycle timing and synchronizing apparatus for use with a multi-cylinder four-cycle reciprocating piston engine having an engine combustion cycle that occurs during two complete revolutions, of a crankshaft while a mechanically coupled valve-operating camshaft undergoes a single revolution, said apparatus comprising:

means for generating first signals representing rotational movements of a crankshaft past a sensor;

means for generating a reference signals representing passage of a predetermined reference portion of said crankshaft with respect to said sensor;

means for forcibly stopping said engine upon engine turn-off at a point in the combustion cycle that substantially prevents reverse rotation of said reference crankshaft portion past said sensor upon engine stoppage;

means for storing the number of said first signals occurring prior to engine stoppage and after the last reference signal prior to engine stoppage, and means for using said stored number of first signals upon engine re-start to maintain synchronization between a camshaft and engine cycle timing as otherwise determined by said first and reference signals.

* * * * *